US 6,722,352 B2

(12) United States Patent
Smolarek et al.

(10) Patent No.: US 6,722,352 B2
(45) Date of Patent: Apr. 20, 2004

(54) PRESSURE-SWING ADSORPTION SYSTEM FOR INTERNAL COMBUSTION ENGINES

(75) Inventors: James Smolarek, Boston, NY (US); David A. Walker, Syracuse, NY (US); Bernard T. Neu, Lancaster, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/985,733

(22) Filed: Nov. 6, 2001

(65) Prior Publication Data

US 2004/0055585 A1 Mar. 25, 2004

(51) Int. Cl.[7] .............................................. F02B 23/00
(52) U.S. Cl. ........................................ 123/585; 123/26
(58) Field of Search ........................ 123/585, 26, 567

(56) References Cited

U.S. PATENT DOCUMENTS

| 4,351,302 A | | 9/1982 | Brettler ...................... 123/566 |
| 4,927,434 A | * | 5/1990 | Cordes et al. .................. 95/15 |
| 5,649,517 A | | 7/1997 | Poola et al. ................. 123/585 |
| 5,678,526 A | | 10/1997 | Cullen et al. ................ 123/690 |
| 5,960,777 A | | 10/1999 | Nemser et al. ............. 123/585 |
| 6,176,897 B1 | | 1/2001 | Keefer ............................ 95/98 |
| 6,352,068 B1 | * | 3/2002 | Jacobsen ................... 123/585 |

FOREIGN PATENT DOCUMENTS

WO        WO9829182        7/1998

OTHER PUBLICATIONS

Lahiri et al. "Utilization Of Oxygen–Enriched Air In Diesel Engines: Fundemental Considerations" *International Combustion Engine,* 1997 Fall Conference, Madison, WI, Sep./Oct. 1997.

H.K. Ng et al., "Potential Benefits of Oxygen–Enriched Intake Air in a Vehicle Powered by a Spark–Ignition Engine", United States Department of Energy Periodical 94013452, Apr. 1944.

* cited by examiner

*Primary Examiner*—Tony M. Argenbright
*Assistant Examiner*—Katrina B. Harris
(74) *Attorney, Agent, or Firm*—David M. Rosenblum (57) ABSTRACT

An internal combustion engine having an integrally connected pressure swing adsorption (PSA) system to provide oxygen-enriched air or oxygen-deficient air, in situ, to the mixing chamber of a spark-ignition or compression-ignition engine.

21 Claims, 6 Drawing Sheets

PRESSURE-SWING ADSORPTION SYSTEM FOR INTERNAL COMBUSTION ENGINES

FIELD OF THE INVENTION

This invention relates to an internal combustion engine having an integrally connected pressure-swing adsorption (PSA)system to provide oxygen-enriched air or oxygen-deficient air, in situ, to the mixing chamber of the engine.

BACKGROUND OF THE INVENTION

The use of conventional internal combustion engines for use in the transportation of passengers and/or cargo has been part of our modern industrial society. The exhaust gas quality and fuel consumption efficiency are important features of the operation of internal combustion engine. These exhaust gas emission features have become increasingly more stringent and by-products of the exhaust gas could be harmful to the environment and human health. Ambient air supplied to the mixing chamber along with conventional fuel of an internal combustion engines produces nitrogen oxides, NOx, that are undesirable components of the exhaust emissions.

It has been understood for several years that the use of oxygen-enriched air in an internal combustion engine produces desirable operating results (i.e. increased power due to more complete fuel combustion and reduced emissions). This has become particularly important for large diesel-type engines such as those used in locomotives, but is also important for standard gasoline automobile engines since laws mandating lower pollutant emissions have been enacted.

U.S. Pat. No. 5,960,777 discloses a novel method of operating an internal combustion engine employing a selectively gas permeable membrane to provide either oxygen or nitrogen enriched air feed to beneficially affect engine performance. By feeding enriched air from a membrane unit such performance parameters as reduced NOx emissions, lean burn limit, engine power, and reduced cold start emissions can be enhanced relative to feeding ambient air. The selectively gas permeable membrane unit further includes a nonporous membrane (i) having an oxygen/nitrogen selectivity of at least 1.4 and a permeability to oxygen of at least 50 barrers; (ii) formed from an amorphous copolymer of perfluoro-2,2-dimethyl-1,3-dioxile; and (iii) being at a temperature below the glass transition temperature of the amorphous copolymer.

U.S. Pat. No. 5,678,526 discloses an internal combustion engine that has a system, including diagnostics, for providing oxygen enriched air so as to control emissions of unburned hydrocarbons and carbon monoxide. The system includes the capability of determining whether the oxygen enrichment system is providing suitable mass flow to the engine and whether oxygen enrichment is available according to the specifications of the enrichment device.

U.S. Pat. No. 5,649,517 discloses an air supply control system for selectively supplying ambient air, oxygen enriched air and nitrogen enriched air to an intake of an internal combustion engine includes an air mixing chamber that is in fluid communication with the air intake. At least a portion of the ambient air flowing to the mixing chamber is selectively diverted through a secondary path that includes a selectively permeable air separating membrane device due a differential pressure established across the air separating membrane. The permeable membrane device separates a portion of the nitrogen in the ambient air so that oxygen enriched air (permeate) and nitrogen enriched air (retentate) are produced. The oxygen enriched air and the nitrogen enriched air can be selectively supplied to the mixing chamber or expelled to atmosphere. Alternatively, a portion of the nitrogen enriched air can be supplied through another control valve to a monatomic-nitrogen plasma generator device so that atomic nitrogen produced from the nitrogen enriched air can be then injected into the exhaust of the engine. The oxygen enriched air or the nitrogen enriched air becomes mixed with the ambient air in the mixing chamber and then the mixed air is supplied to the intake of the engine. As a result, the air being supplied to the intake of the engine can be regulated with respect to the concentration of oxygen and/or nitrogen.

U.S. Pat. No. 4,351,302 discloses an apparatus for reduction of pollutant emissions by internal combustion engines that includes a tapered, coaxial multiconical structure used as a gas separator. The gas separator is used to provide oxygen enriched air to an engine, thus providing a reduction in the amount of nitrogen provided thereto. The resulting exhaust gas includes fewer oxides of nitrogen, reduced quantities of hydrocarbons, and decreased percentages of carbon monoxide. Air is directed through the structure, entering at a wide mouth throve. A fan may be provided for directing the air through the structure. The air exiting at the central portion of the narrow end of the structure, which has an increased ratio of oxygen to nitrogen, is directed by a conduit to the engine inlet. The structure is inexpensive, and easily mounted on existing engines, thus providing a retrofitting device for conforming older cars to current pollution standards.

U.S. Pat. No. 6,176,897 discloses a pressure swing adsorption separation of a feed gas mixture, to obtain a purified product gas of the less strongly adsorbed fraction of the feed gas mixture, and in a plurality of preferably an even number of adsorbent beds are used, with each adsorbent bed communicating at its product end directly to a variable volume expansion chamber, and at its feed end by directional valves to a feed compressor and an exhaust vacuum pump. For high frequency operation of the pressure swing adsorption cycle, a high surface area layered support is used for the adsorbent. The compressor and vacuum pump pistons may be integrated with the cycle, reciprocating at twice the cycle frequency.

Delivery of oxygen-enriched air to the intake of an internal combustion engine has been shown to reduce the emissions of air pollutants from the engine exhaust and increase the power output by driving the combustion of the fuel closer to completion. Some of the fundamental considerations of these phenomena were studies and presented in a technical paper by Lahiri, et al. (Lahiri, D. Mehta, P. S., Poola, R. B., and Sekar, R. R.; "Utilization of Oxygen-Enriched Air in Diesel Engines: Fundamental Considerations", International Combustion Engine, 1997 Fall Conference, Madison, Wis., September/October 1997). The computed properties, such as adiabatic flame temperature and exhaust gas composition as well as differences in thermodynamic and transport properties when oxygen-enriched air was used in place of normal atmospheric air in internal combustion engines were recited in this reference. The effects on parameters impacting engine performance such as fuel evaporation rate and ignition delay were also studied. This paper explains why oxygen-enriched air has beneficial effects when used in internal combustion engines.

A paper providing useful background information was presented by Ng and Sekar (Ng, M. K. and Sekar, R. R.; "Potential Benefits of Oxygen-Enriched Intake air in a Vehicle Powered by a Spark-Ignition Engine", DOE Periodical 94013452, April 1994). Oxygen-enriched air (25%, 28%, and 30% by volume) was tested in a gasoline engine (3.1 L Chevy Lumina, 1990), and its effects on emissions were studies. The amounts of CO, hydrocarbons, and ozone were shown to decrease and the NOx was shown to increase at the outlets of the catalytic converter as well as the engine itself.

An objective of the present invention is to provide a means to generate oxygen-enriched or oxygen-deficient air, in situ, for apparatus in which the desired gas is produced from a pressure swing adsorption system that forms an integral part of the apparatus.

Another objective of the present invention is an internal combustion engine having a pressure swing adsorption system, as an integral part of the engine, to provide oxygen-enriched or oxygen-deficient gas for the mixing chamber of the engine.

Another objective of the present invention is a spark-ignition engine having a pressure swing adsorption system as an integral part of the engine and wherein the crank shaft and cam shaft of the engine also preforms the pressure and evacuation means for the pressure swing adsorption system.

Another objective of the present invention is a compression-ignition (diesel) engine having a separate pressure swing adsorption system assembled as an integral part of the engine.

With these and other objects in mind, the present invention is hereinafter described in several embodiments of the invention, and the novel features thereof being particularly pointed out in the appended claims.

SUMMARY OF THE INVENTION

The invention relates to an internal combustion engine having a pressure swing adsorption (PSA) system as an integral part of the engine comprising:

an internal combustion engine having a mixing chamber with an air inlet for the engine; and at least one PSA bed containing an adsorbent material adapted for adsorbing oxygen or nitrogen from an ambient air and having a PSA bed air intake adapted for receiving ambient air and a PSA bed outlet adapted for discharging an oxygen-enriched air or an oxygen-deficient air product after the air is passed through the absorbent material, and said PSA bed outlet coupled to the inlet of the mixing chamber and operable such that the oxygen-enriched air or oxygen-deficient air from the integrally assembled pressure swing adsorption system of the engine can be fed into the mixing chamber for operating the engine. This internal combustion engine can have the adsorbent material selectively adsorb nitrogen so that an oxygen-enriched air can be fed into the mixing chamber of the engine intake or the adsorbent material can selectively adsorb oxygen so that an oxygen-deficient air can be fed into the mixing chamber of the engine intake.

Another embodiment of this invention relates to a spark-ignition internal combustion engine having an integrally assembled pressure swing adsorption (PSA bed) system wherein the engine contains an inlet, a crank shaft and a cam shaft; an intake of the PSA bed coupled to at least two cylinders having intakes and outlets with pistons operable in out of phase cycles for generating pressure differentials within the bed containing an adsorbent material for producing oxygen-enriched air or oxygen-deficient air for the engine inlet with said crank shaft and said cam shaft being coupled to and sequentially operating the pistons and cylinder intakes and outlets to produce oxygen-enriched or oxygen-deficient gas for the mixing chamber of the engine.

Another embodiment of this invention relates to a compression-ignition (diesel) internal combustion engine having a separate integrally assembled pressure swing adsorption system and wherein a turbo compressor of the engine has a turbo air inlet for receiving air and a turbo outlet coupled to an inlet of the PSA bed and operable such that the turbo compressor generates pressure differentials within the PSA bed containing an adsorbent material for producing oxygen-enriched air or oxygen-deficient air to be discharged from an outlet of the PSA bed and fed into a mixing chamber coupled to an inlet of the engine.

In summary, there are benefits for using oxygen-enriched air (or to a lesser degree, nitrogen-enriched air) as the oxidizer in internal combustion engines. There have been different methods proposed to supply the enriched air with the majority of the prior art utilizing semi-permeable membranes. The present invention proposes the use of a small PSA, preferably incorporated into the engine block as an integral part of the block, to supply desirable and selective air to the engine. One of the novel main features of the engine is the use of the drivers (i.e. crankshaft and cam shaft) to drive the PSA. Using the PSA as an integral part of the engine provides advantages in terms of energy usage and overall space requirements.

Prior art systems generally utilize semi-permeable membranes to enrich atmospheric air in oxygen or nitrogen for use in internal combustion engines. Ranges of concentration cited are from 23–40% by volume of oxygen (oxygen-enriched) and 80–98% by volume of nitrogen (nitrogen-enriched). The present invention uses a small PSA system requiring approximately 10 to 1000 lbs. of adsorbent material depending on engine displacement. Conventional automobiles should require about 25 lbs. to accomplish air enrichment and produce equivalent or superior results with regard to power output and emissions reduction using prior art membranes. Additionally, the PSA system is generally less sensitive than a membrane with regards to the presence of solid particles, and temperature fluctuations in the feed leading to a longer effective lifetime and less maintenance. There is also considerable flexibility in the quality of the oxygen that can be generated by the PSA so the unit can supply the optimum concentration of oxygen in air depending on the specific system requirement. The simplest apparatus can produce low to medium-grade oxygen between 22% and 30% oxygen, while other embodiments can produce high-quality oxygen above 80% of oxygen by volume.

Oxygen quality can be defined as follows:

| | |
|---|---|
| Low-grade | 22–30% by volume |
| Medium-grade | 30–80% by volume |
| High-grade | 80–98% by volume |

Advantages of using the PSA as an integral part of the engine are that it provides efficient energy usage and overall minimal space requirements.

For spark- and compression-ignition systems using oxygen-enriched air, the adsorption material for the PSA bed can be zeolites containing one or more cations selected from the group comprising sodium, lithium, calcium, potassium, strontium ions and the like and preferably the adsorption material should be suitable for high temperature operations. For engines using oxygen-deficient air, the adsorption material for the PSA bed can be a porous framework comprising one or more transition element complexes (TECs) as disclosed in European application EP 1106245A.

BRIEF DESCRIPTION OF THE DRAWINGS

FIG. 3 comprises the position of the pistons of a four-stroke cylinder PSA cycle in which FIG. 3B is a schematic diagram of a piston in a cylinder showing the piston in a position for receiving atmospheric air into the cylinder.

DETAILED DESCRIPTION OF EMBODIMENTS OF THE INVENTION

An internal combustion engine requires the simultaneous input of air and fuel (diesel fuel, gasoline, etc.) to its cylinders to produce driving energy. The use of oxygen-enriched air (22–40% oxygen by volume) in place of normal air (generally 21% oxygen by volume) provides certain operating advantages. Increased power and reduced emissions of products, such as CO, hydrocarbons, etc., result from a more complete oxidation of the fuel. A preferred embodiment of this invention utilizes a small pressure-swing adsorption (PSA) unit incorporated into or integrally connected with the engine block to generate the enriched air.

Pressure-swing adsorption takes advantage of the differences in the adsorption capacity of adsorbent (e.g. molecular sieve) materials for certain molecules. In a preferred embodiment, and adsorbent is used where nitrogen molecules in air are more readily adsorbed than oxygen molecules which pass by more easily. By removing some of the contained nitrogen, the adsorbent bed allows oxygen-enriched air to pass through. The adsorption takes place under pressure. When the pressure in the bed is subsequently reduced (i.e. a pressure swing), the adsorbed nitrogen molecules are desorbed and purged from the bed. The desorption pressure may be atmospheric or sub-atmospheric. There are many different types of materials that function to separate components of air. One class of material that can be used for oxygen-enriched applications is preferably zeolites including lithium exchanged zeolite, most preferably LiX zeolites.

Figure 1:
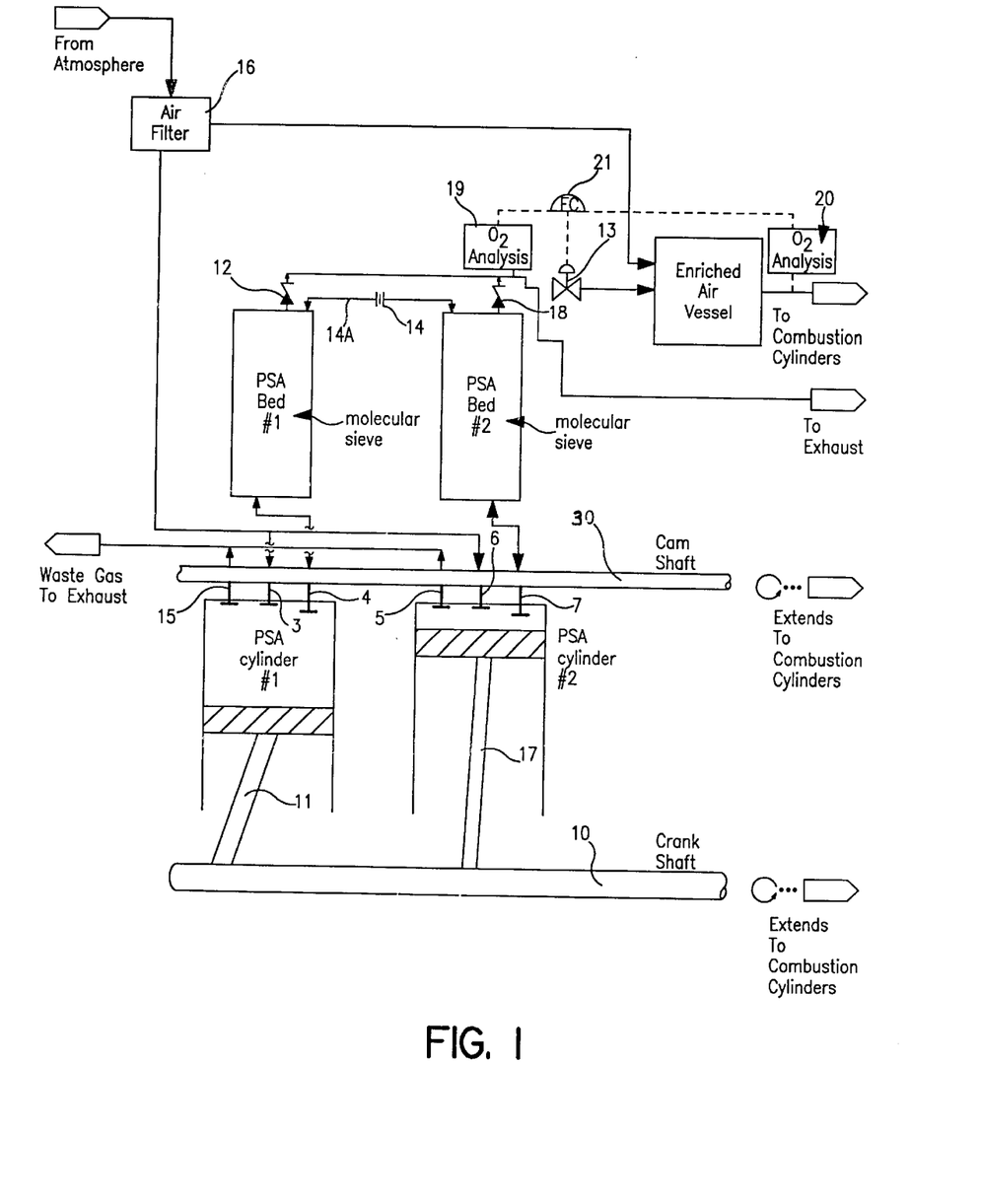
FIG. 1 is a schematic diagram of a pressure swing adsorption system integrally assembled in an internal combustion engine of the invention.
Figure 2:
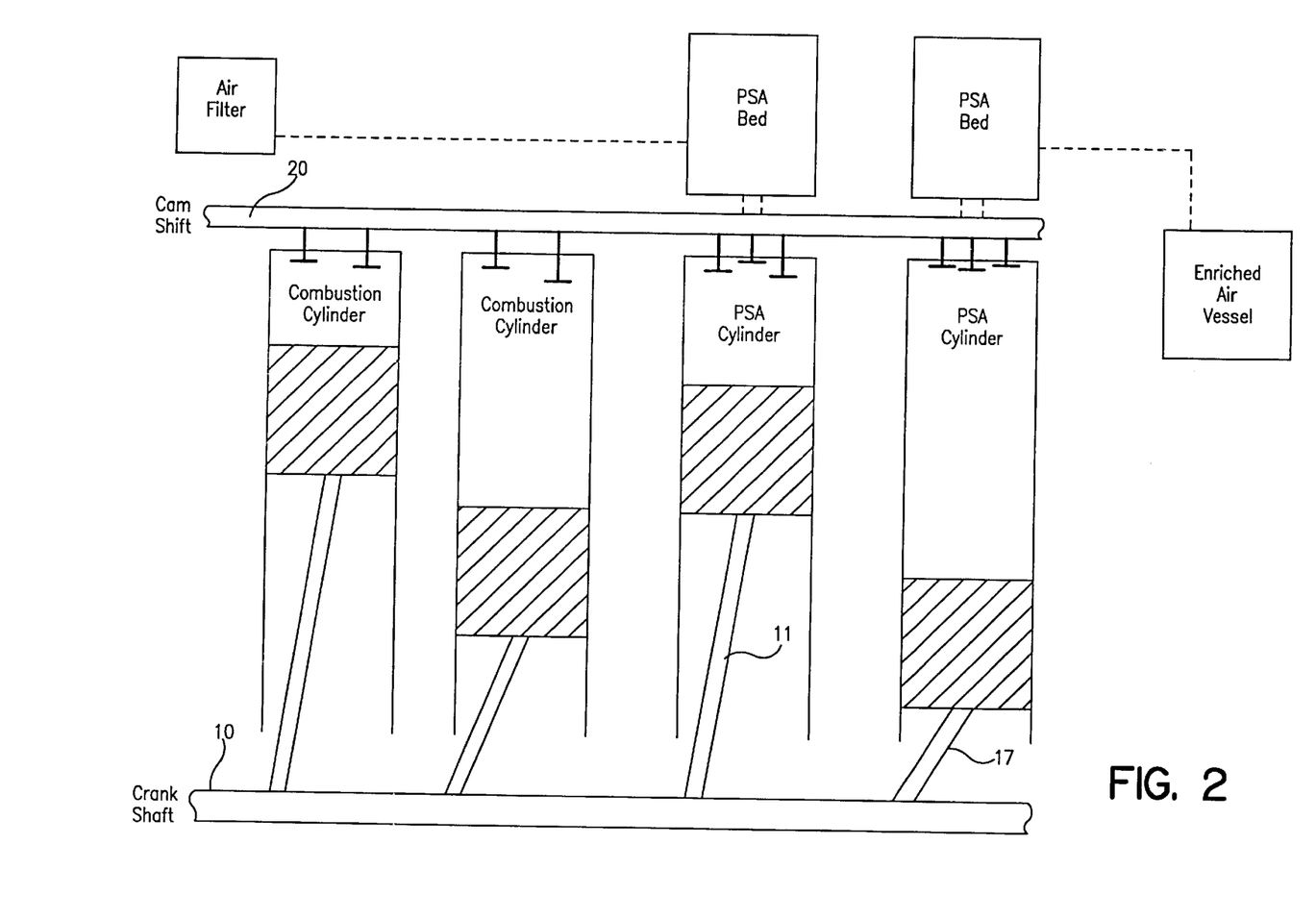
FIG. 2 is a schematic diagram of the relative position of a four-stroke cylinder system for operating the compressing and evacuator steps for a PSA system using the cam shaft and crank shaft of the engine for sequentially operating the piston positions and cylinder openings.
Figure 3A:
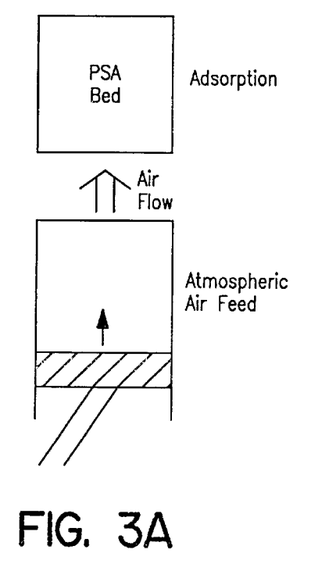
FIG. 3A is a schematic diagram of a piston in a cylinder compressing atmospheric air.
Figure 3B:
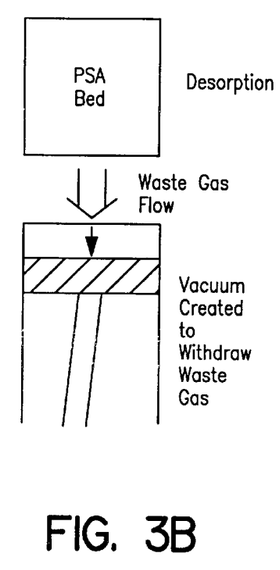
FIG. 3B is a schematic diagram of a piston in a cylinder creating a vacuum to withdraw waste gas.
Figure 3C:
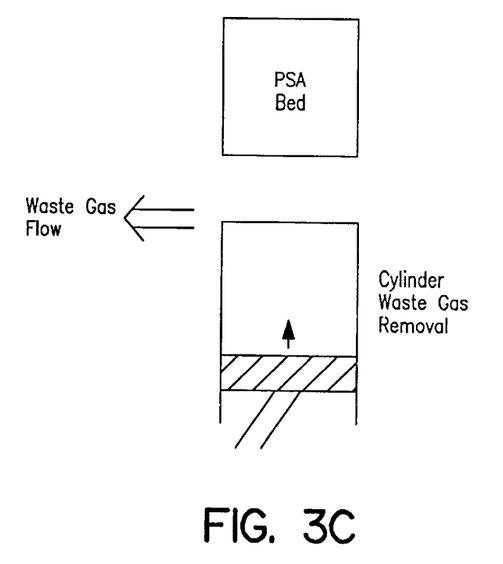
FIG. 3C is a schematic diagram of a piston in a cylinder showing the compressing and removal of waste gas from the cylinder.
Figure 3D:
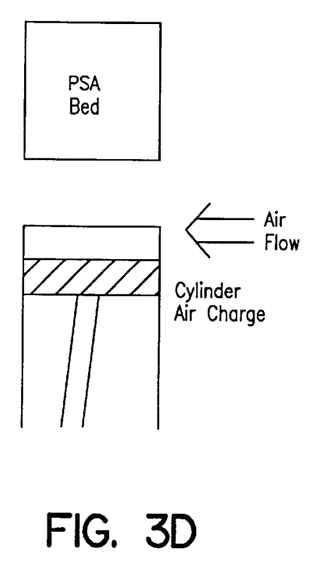

A process (schematic) flow diagram for a PSA system integrally assembled to a mixing chamber of an engine is shown in FIG. 1. The relative position of the cylinder and piston arrangement of the engine and the PSA shown in FIG. 1 is further illustrated in FIG. 2. The system of FIG. 1 operates on a four-step cycle and employs two cylinders to generate the pressure differentials required to transfer process gases as schematically illustrated in FIGS. 3A to 3D. Each cylinder is connected to a bed containing adsorbent (e.g. molecular sieve) material(s). The cylinders operate two steps out of phase (i.e. one cylinder is on step 1 while the other is on step 3, etc.). This allows one PSA bed to produce oxygen-enriched air while the other PSA bed #2 is being regenerated thereby increasing process efficiency. The cycles of the two cylinders and beds is described below to illustrate the operation:

Bed #1 Step 1; Bed #2 Step 3

When engine crank shaft 10 drives the piston 11 in Cylinder #1 upward, the engine cam shaft 30 opens Valve 4, and atmospheric air is pushed through PSA Bed #1 raising its pressure. Nitrogen molecules are preferably adsorbed on the molecular sieve and oxygen-enriched air leaves the output 12 of the PSA bed #1. The air passes through Check Valve 12, through Flow Valve 13, and into the Enriched Air Vessel.

Simultaneously, piston 17 in Cylinder #2 is driven upward to expel the waste gas that was pulled from PSA Bed #2 during its Step 2. Valve 5 is open to the atmosphere to provide a flow path for the waste gas and Valve 7 is closed isolating the bed from the cylinder. PSA Bed #2 begins the step under the vacuum induced during its Step 2 and medium to high quality oxygen-enriched air flows into the PSA bed #2 through the restriction orifice 14 between the two PSA beds raising its pressure over the course of the step. The orifice 14 is sized so that only a small amount of gas is transferred between beds and most is sent to the Enriched Air Vessel. The oxygen-enriched air flowing into PSA Bed #2 partially repressurizes the bed and increases its efficiency during its enriched-air-producing step.

Bed #1 Step 2; Bed #2 Step 4

The crank shaft 10 pulls the piston 11 in Cylinder #1 downward creating a vacuum in the evacuated Cylinder #1 and PSA Bed #1. Nitrogen desorbs from the sieve and flows through Valve 4 into Cylinder #1. When the pressure in PSA Bed #1 reaches the same level as that in PSA Bed #2, a small amount of oxygen-enriched air flows through the restriction orifice 14 between the beds and helps purge Bed #1 of adsorbed impurities. This increases the efficiency of the regeneration.

Simultaneously, the piston in Cylinder #2 is pulled downward. Valve 6 opens and atmospheric air is pulled through the air filter 16 and into cylinder 17. PSA Bed #2 is isolated from its cylinder 17 during this step. Some of the oxygen-enriched air that was collected during Step 3 flows between beds to help purge PSA Bed #1. The pressure in PSA Bed #2 goes down, but still remains above the levels produced during the purge step (i.e. Step 2).

Bed #1 Step 3; Bed #2 Step 1

The sequence of steps described above is reversed between the cylinders/bed combinations in the next two steps. The piston 11 in Cylinder #1 is driven upward expelling waste gas through Valve 15 to the atmosphere. Simultaneously, the piston 17 in Cylinder #2 is driven upward and PSA Bed #2 produces oxygen-enriched air with most flowing through check valve 18 to the Enriched Air Vessel and some flowing through the restriction orifice 14 between beds. The pressure in PSA Bed #1 begins at vacuum and increases somewhat because of the gas entering from PSA Bed #2. The pressure in PSA Bed #2 is increased to its producing level.

Bed #1 Step 4; Bed #2 Step 2

The piston 11 in Cylinder #1 is pulled downward admitting atmospheric air through filter 16 and into Valve 3. The piston 17 in Cylinder #2 is pulled downward to desorb the impurities in PSA Bed #2. Again, gas flows through the restriction orifice 14 between beds. The pressure in PSA Bed #1 falls slightly because some of its gas is transferred to PSA Bed #2. The pressure in PSA Bed #2 falls as it is evacuated and purged of impurities.

One of the advantages of this system is that it can be incorporated into the engine block itself. The main engine crank shaft drives the pistons, and the openings (valves) associated with the cylinders are opened and closed by the main engine cam shaft. The entire apparatus is small enough that it will not significantly impact the overall space requirements of the engine.

The concentration of oxygen in the air sent to the engine combustion cylinders is controlled by two oxygen sensors 19 and 20 and a control valve 21. The oxygen sensors provide the concentration of oxygen in the air leaving the PSA beds and fed to the Enriched Air Vessel. If the air being sent to the engine combustion cylinders contains too much oxygen, Flow Valve 13 is closed to reduce the amount of oxygen-enriched air entering the Enriched Air Vessel and the excess gas is vented as exhaust. If more oxygen is needed for the engine cylinders, the valve 13 is opened wider and more enriched air flows to the Enriched Air Vessel increasing the overall concentration of oxygen in the vessel. The actuation of the valve can be electronic or pneumatic.

The line 14A connecting the two beds #1 and #2 and the restriction orifice 14 are included to enhance the efficiency of the process. The ability to purge and repressurize the beds with oxygen-enriched air increases the quality of the product generated by the system. The orifice 14 is sized based on the volumes of the beds and cylinders as well as the flowrates of the gases transferred during various steps.

Figure 4:
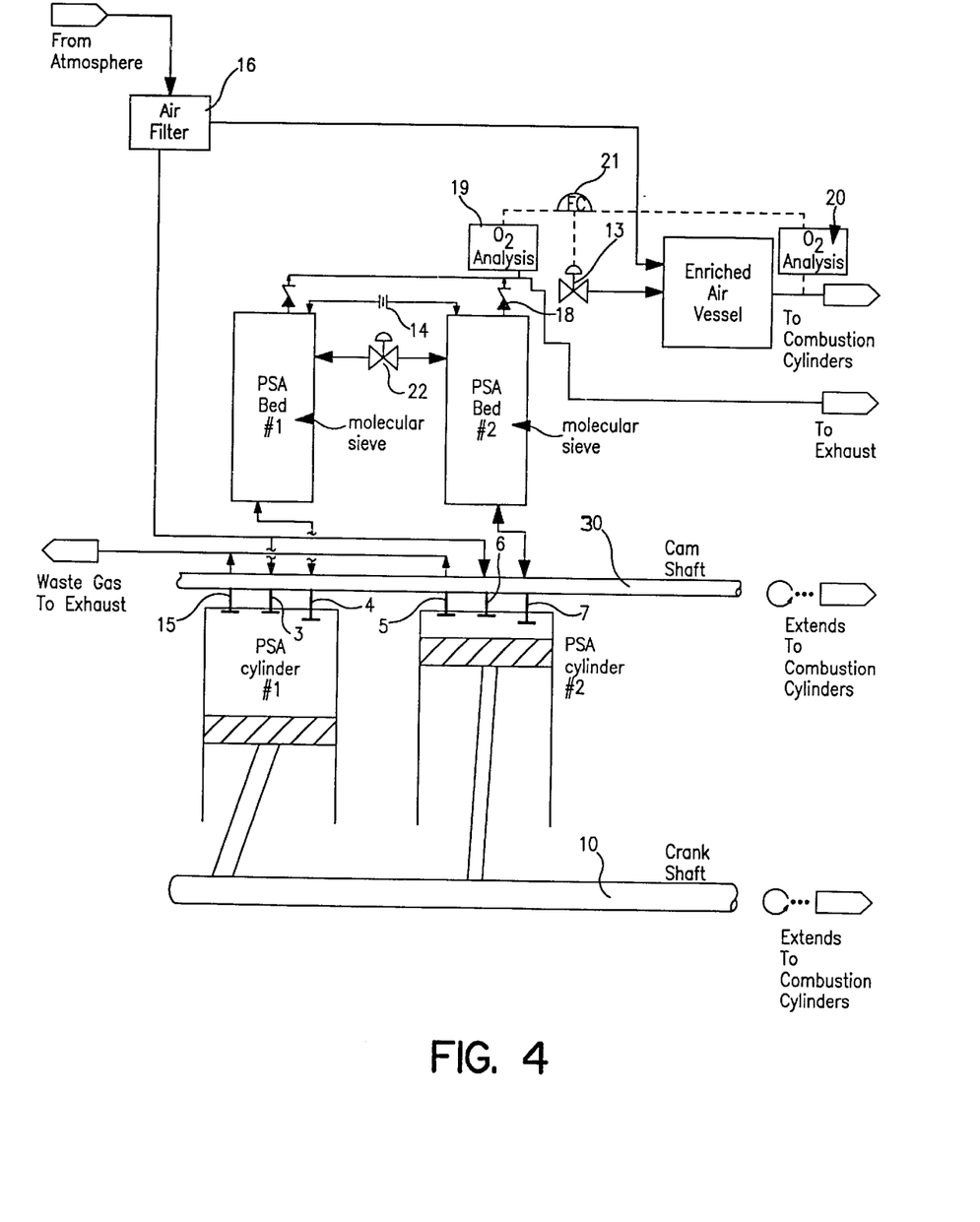
FIG. 4 is a schematic diagram of another embodiment of a pressure swing system integrally assembled in an internal combustion engine of the invention.

In another embodiment as shown in FIG. 4 with the components being the same reference numbers, the efficiency of the process can be further enhanced by the addition of a line between the PSA beds which includes a control valve 22. The valve 22 would open at appropriate times during the cycles of the cylinder/PSA bed combinations to supply a greater quantity of gas for the purge or repressurization of a bed. For example, at the end of step 1 for Cylinder #1, there is still medium to high quality oxygen remaining in PSA Bed #1. Some of that gas is transferred to PSA Bed #2 through the restriction orifice 14 over the course of the step, but some still remains at the end of the step. The control valve 22 opens at that point allowing the rest of the gas to flow into PSA Bed #2. That gas serves to enhance the repressurization of the bed and increase the efficiency of the adsorption step (i.e. Cylinder #2, Step 1). Additionally, at the end of step 2 for PSA Bed #1, the control valve 22 could again open to allow oxygen-enriched air to flow from PSA Bed #2 and increase the efficiency of the purge.

Figure 5:
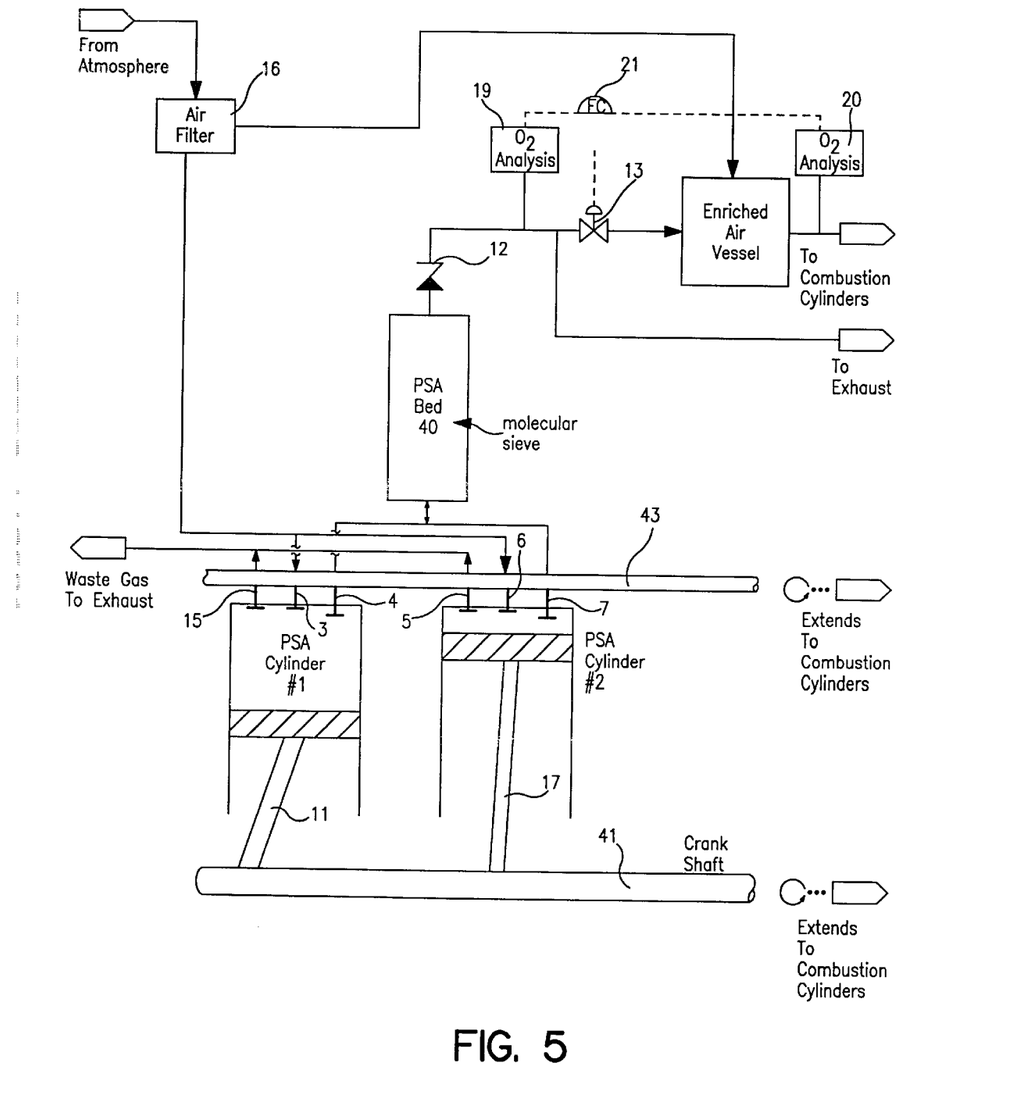
FIG. 5 is a schematic diagram of a pressure swing system integrally assembled with an internal combustion engine using one PSA bed.

Another embodiment of this invention is shown in the schematic flow diagram of FIG. 5 having components with the same reference numbers of like components in FIGS. 1 to 4, with a major difference is that the engine has only one PSA bed 40 in conjunction with two cylinders #1 and #2. The bed is packed with the same molecular sieve material(s) and atmospheric air is enriched in oxygen as described above. The four-stroke cycles in the cylinders are two steps out of phase and operate as described below.

Cylinder #1, Step 1; Cylinder #2, Step 3

The piston in Cylinder #1 is driven upward by the main engine crankshaft 41 while the main engine cam shaft 43 pens Valve 4. Atmospheric air is pushed through the PSA Bed 40 raising its pressure. Nitrogen is preferentially adsorbed on the molecular sieve material(s) and oxygen-enriched air passes out of the cylinder, through the bed, through the check valve 12, through Flow Valve 13, and into the Enriched Air Vessel.

Simultaneously, the piston in Cylinder #2 is driven upward with Valve 7 closed and Valve 5 open. This isolates the PSA Bed 40 from the cylinder and allows the waste gas that was collected during Step 3 to flow out of the system.

Cylinder #1, Step 2; Cylinder #2, Step 4

The piston in Cylinder #1 is pulled downward while Valve 4 remains open. This includes a vacuum in the PSA Bed 40 and impurities (mainly nitrogen) adsorbed on the molecular sieve desorbs and is drawn into the cylinder.

At the same time, the piston in Cylinder #2 is pulled downward with Valve 6 open and Valves 5 & 7 closed. This allows atmospheric air to flow into the cylinder and for interdiction into the PSA Bed 40 later in the cycle.

Cylinder #1, Step 3; Cylinder #2, Step 1

The steps described above are reversed between cylinders. The piston in Cylinder #1 is pushed upward as Valve 4 is closed, and Valve 15 is opened isolating the cylinder from the PSA Bed 40. Waste gas is expelled from the cylinder to the exhaust. The piston in Cylinder #2 is driven upward to push air through the PSA Bed 40, raise its pressure, and generate oxygen-enriched air.

Cylinder #1, Step 4; Cylinder #2, Step 2

The cycle is completed as the piston in Cylinder #1 is pulled downward, Valve 15 is closed and Valve 3 is opened. Atmospheric air is pulled through the air filter and into the cylinder.

The piston in Cylinder #2 is also pulled downward to reduce the pressure in the PSA Bed 40 and remove waste gases from the molecular sieve. Valve 7 remains open and waste gas flows into the cylinder. This system produces only low (20% to 30% oxygen by volume) to medium (30% to 80% oxygen by volume) grade oxygen for two reasons:

(1) The bed regeneration is not as efficient due to the absence of purge gas.

(2) The absence of repressurization with enriched air causes the adsorption step to be less efficient.

The advantage of this system is that it requires less equipment and, therefore, even less space than the two-bed process described above.

Many large diesel engines utilize turbo chargers to increase their power output. Turbo chargers compress the inlet combustion air to some level above atmospheric pressure before introduction into the combustion cylinders. This increases the amount of oxygen available per unit volume of fuel in the cylinder and, thus, increases the rate of the combustion reaction. The mechanism is similar to that observed when oxygen-enriched air is used at low pressure.

Figure 6:
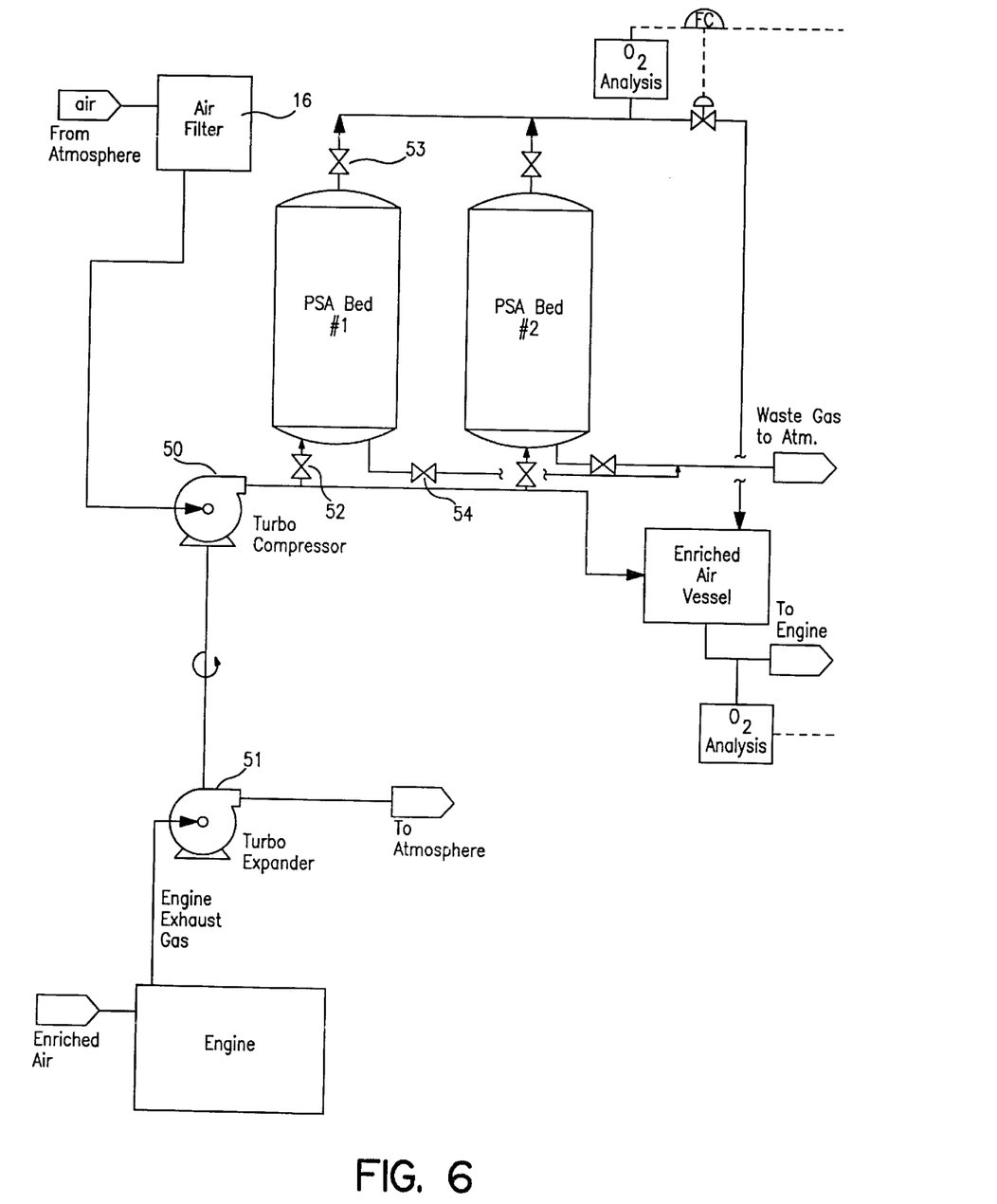
FIG. 6 is a schematic diagram of a pressure swing system integrally assembled with a turbo compression engine of the invention.

An alternative apparatus utilizing a PSA system to generate oxygen-enriched air for a turbo charger internal combustion engine is shown in FIG. 6. In this mode of operation, air is drawn through an air filter by a turbo charger 50 driven by a turbo expander 51 that recovers a portion of the compression component initially supplied by the charge itself. The PSA operates with an even simpler two-step cycle:

Step 1: With Valve 52 and Valve 53 open, the compressed air flows through the PSA Bed 55 producing oxygen-enriched air.

Step 2: With Valve 52 and 53 closed while Valve 54 opens, the PSA bed 55 is rapidly depressurized and nitrogen is desorbed. The waste gas leaves the bed as exhaust.

PSA Bed #56 is regenerated when bed #55 is producing enriched air. In this way, the supply of product is continuous. The size of the beds and the adsorption time per bed can be optimized to ensure a reliable air supply while maintaining a compact size for incorporation into an engine. Note that the control scheme used to regulate the concentration of oxygen in the air supplied to the engine is identical to that described above.

The turbocharger engine employed in this mode of operation is somewhat different than that described in the other embodiments. In the other embodiments, the cylinders and PSA beds are integral parts of the engine block and utilize the same drive systems as the combustion cylinders (i.e. the crankshaft and cam shaft). In the turbocharger engine, there is much more flexibility in the placement of the PSA since other parts of the engine are not used to operate the PSA system. It is only necessary to connect the turbo charger, the turbo expander, and the Enriched Air Vessel to the engine. The air filter and oxygen concentration control are unchanged from the gasoline engine embodiment.

The above described embodiments of operation of FIGS. 1 to 5 are similar to the embodiment described immediately above (FIG. 6) with the exception of the means to compress the inlet air. It is possible to substitute an air supercharger (e.g. Roots compression unit) for the turbo charger. The power for this unit would be supplied by the engine driveshaft. This mode would be somewhat less efficient in terms of required power since the compression work supplied by the supercharger would not be recovered. It would, however, be possible to better optimize the PSA process utilizing this type of system since the condition of the air supply would not be linked to the operation of the engine itself. The other components of the system would remain the same.

Other apparatus or engines (i.e. PSA system incorporated into the block of an internal combustion engine) could use different adsorbent material to generate oxygen-deficient (nitrogen-enriched) air. The use of oxygen-deplete air containing less oxygen (i.e. 2–20% by volume) than normal atmospheric air as the oxidizer in an internal combustion engine generates generally less NOx than in conventional engines and therefore it necessarily produces more hydrocarbons and CO in the exhaust than an engine using normal atmospheric air. A cooling means could be added to enhance process efficiency by cooling the process gases. A non-containing friction reduction system can be used if desired.

Obviously, many modifications and variations of the present invention are possible in light of the above teachings. For example, an independently valve activating system could be incorporated in the PSA system. Thus, it is to be understood that, within the scope of the appended claims, this invention may be practiced otherwise than as specifically described above.

What is claimed is:

1. An internal combustion engine having a pressure swing adsorption (PSA) system as an integral part of the engine comprising:

an internal combustion engine having a mixing chamber with an air inlet for said engine; and at least one PSA bed integral with the combustion engine and containing an adsorbent material adapted for adsorbing oxygen or nitrogen from an ambient air and having a PSA bed air intake adapted for receiving ambient air and a PSA bed outlet adapted for discharging an oxygen-enriched air or an oxygen-deficient air product after the ambient air is passed through said adsorbent material, and said PSA bed outlet coupled to the inlet of the mixing chamber and operable such that oxygen-enriched air or oxygen-deficient air from the integrally assembled PSA system can be fed into the mixing chamber of the engine.

2. The internal combustion engine of claim 1 having more than one PSA bed integrally assembled with the engine.

3. The internal combustion engine of claim 1 having more than one PSA bed integrally assembled into the engine.

4. The internal combustion engine of claim 1 wherein the adsorbent material selectively adsorbs nitrogen and is adapted so that oxygen-enriched air can be fed into the mixing chamber of the engine.

5. The internal combustion engine of claim 1 wherein the adsorbent material selectively adsorbs oxygen and is adapted so that oxygen-deficient air can be fed into the mixing chamber of the engine.

6. The internal combustion engine of claim 1 wherein the engine contains a crank shaft and a cam shaft; the PSA bed intake is coupled to at least two cylinders with pistons operable in out of phase cycles for generation of pressure differentials within the PSA bed containing the adsorbent material and adapted for producing oxygen-enriched air or oxygen-deficient air to be fed into the mixing chamber inlet of the engine with said crank shaft and said cam shaft being coupled to and sequentially operating the movement of the pistons within the cylinders, and the openings and closings of the outlets on the cylinders.

7. The internal combustion engine of claim 6 wherein an independent valve activity system is incorporated in the PSA system.

8. The internal combustion engine of claim 6 wherein the engine contains at least two PSA beds coupled to said cylinders containing pistons operable in out of phase cycles for generating pressure differentials within said PSA beds.

9. The internal combustion engine of claim 8 wherein the engine contains two cylinders each with a piston and two PSA beds.

10. The internal combustion engine of claim 8 wherein the PSA bed outlets are coupled together and adapted such that oxygen-enriched or oxygen-deficient air can be freely fed between said PSA beds.

11. The internal combustion engine of claim 10 wherein a control valve is connected between the outlets of the PSA beds.

12. The internal combustion engine of claim 4 wherein the adsorbent material is selected from the group consisting of zeolites, lithium, calcium, potassium, and strontium.

13. The internal combustion engine of claim 5 wherein the adsorbent material is a porous framework comprising one or more transition element complexes (TECs).

14. The internal combustion engine of claim 12 wherein the engine contains a crank shaft and a cam shaft; the PSA bed intake is coupled to at least two cylinders with pistons operable in out of phase cycles for generation of pressure differentials within the PSA bed containing the adsorbent material and adapted for producing oxygen-enriched air or oxygen-deficient air to be fed into the mixing chamber inlet of the engine with said crank shaft and said cam shaft being coupled to and sequentially operating the movement of the pistons within the cylinders, and controlling the openings and closings of the outlets on the cylinders.

15. The internal combustion engine of claim 14 wherein the engine contains at least two PSA beds coupled to said cylinders containing pistons operable in out of phase cycles for generating pressure differentials within said PSA beds.

16. The internal combustion engine of claim 15 wherein a control valve is connected between the outlets of the PSA beds.

17. The internal combustion engine of claim 1 wherein a turbo compressor having a turbo air inlet and is adapted for receiving air, and a turbo outlet coupled to said PSA inlet and operable such that the turbo compressor generates pressure differentials within the PSA bed containing the adsorbent material which is adapted for producing oxygen-enriched air or oxygen-deficient air to be fed into the mixing chamber of said engine.

18. The internal combustion engine of claim 1 wherein the adsorbent material selectively adsorbs nitrogen and is adapted so that oxygen-enriched air can be fed into the mixing chamber of the engine.

19. The internal combustion engine of claim 1 wherein the adsorbent material selectively adsorbs oxygen and is adapted so that oxygen-deficient air can be fed into the mixing chamber of the engine.

20. The internal combustion engine of claim 1 wherein the adsorbent material is selected from the group consisting of zeolites, lithium, calcium, potassium, and strontium.

21. The internal combustion engine of claim 20 wherein the adsorbent material is a porous framework comprising one or more transition element complexes (TECs).

\* \* \* \* \*